United States Patent Office 3,219,441
Patented Nov. 23, 1965

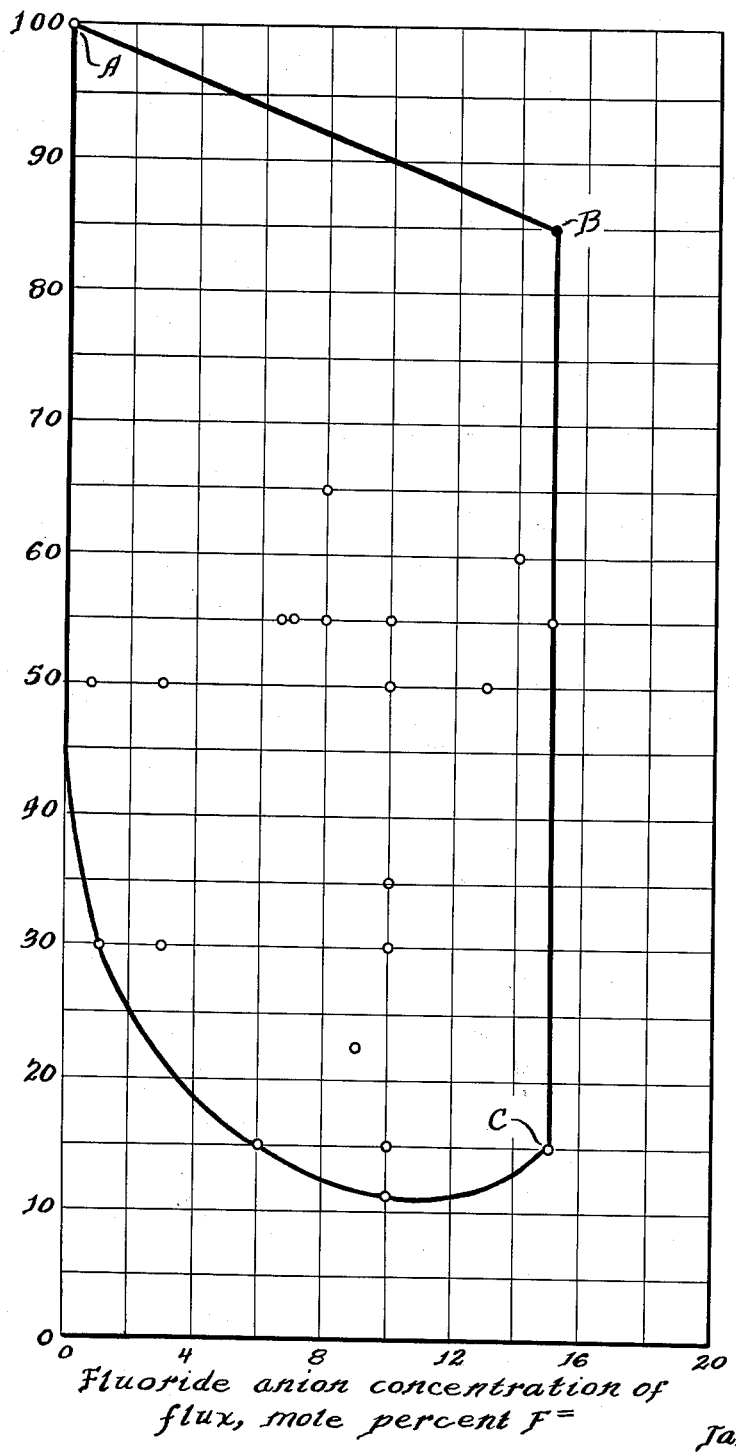

3,219,441
PROCESS OF PREPARING THORIUM METAL FROM THE OXIDE
James B. Knighton, Joliet, Ill., and Alleppey V. Hariharan, Bombay, India, assignors to the United States of America as represented by the United States Atomic Energy Commission
Filed Aug. 18, 1964, Ser. No. 390,494
6 Claims. (Cl. 75—84.1)

This application is a continuation-in-part of our copending application Serial No. 219,828, and now abandoned, filed on August 24, 1962.

This invention was made in the course of, or under, a contract with the U.S. Atomic Energy Commission.

This invention deals with the production of thorium metal from thorium oxide by the reduction of the oxide in a molten salt with magnesium metal. Salt-dispersed thorium oxide has been reduced heretofore with magnesium, the salt or flux consisting of about 5 mole percent of magnesium fluoride and 95 mole percent of a magnesium chloride-lithium chloride (or other alkali metal chloride or alkaline earth metal chloride) mixture. That process is the subject matter of assignee's U.S. Patent No. 3,109,731 granted on November 5, 1963, to the coinventor of this application, James B. Knighton. The flux preferred there contained about 47.5 mole percent of magnesium chloride, 5 mole percent of magnesium fluoride and 47.5 mole percent of lithium chloride.

The process of the above-identified patent application, however, has its economic limitations; the flux, and more particularly the magnesium fluoride and the lithium chloride are rather expensive.

It is an object of this invention to provide a process for the reduction, by magnesium, or thorium oxide dispersed in a fused halide flux which is less expensive than the above-described process and yet yields a quantitative reduction in a short period of time.

A great many studies were made in an attempt to replace the rather expensive magnesium fluoride by the less expensive calcium fluoride in the flux. At the same time the effect of variations of the magnesium chloride concentration in calcium chloride-calcium fluoride fluxes on the efficiency of thorium dioxide reduction was studied.

In all these experiments, thorium dioxide was introduced into a tantalum crucible which contained about the 44-fold amount of the respective molten flux. To this there was then added a magnesium-zinc alloy, the magnesium content of which was about 5% by weight. The weight of the alloy was double that of the flux. The temperature was maintained at approximately 750° C. for four hours, and the mass was agitated with a tantalum rod at 800 r.p.m. The experiments were carried out in an inert atmosphere of argon gas.

All experiments that yielded a 100%, or almost 100%, reduction were plotted in a diagram in which the fluoride anion concentration of the flux, as $F^=$, was entered on the abscissa and the magnesium cation concentration of the flux on the ordinate. This diagram is shown on the accompanying drawing. The borderline values for the 100-percent yields form a parabolic curve which defines the area of flux compositions that result in quantitative yields.

This borderline curve shows that a magnesium concentration of at least 11 mole percent is necessary in the flux for the desired object of quantitative reduction. Calcium fluoride concentrations higher than about 15 mole percent were found unfeasible, because they result in a flux of too high a melting point. The fluxes tested were therefore limited to those containing 15% or less calcium fluoride. Since the diagram also indicates that magnesium chloride alone yields a 100-percent reduction (see point A of the diagram) and since the maximum fluoride anion concentration, which means the maximum calcium fluoride concentration suitable for practical purposes, is 15 mole percent, the highest magnesium concentration at this highest calcium fluoride concentration (without any calcium chloride) would be 100 less 15%, or 85 mole percent. This is calculated point B in the diagram. Thus the area of quantitativeness is limited by line A–B, vertical 15-percent-$F_2$= line B–C and the "borderline" parabola C–A. Expressed in numerical values, the flux can contain from 11 to 100 mole percent magnesium chloride, from 0 to 15 mole percent calcium fluoride, the balance, namely 89 to 0 mole percent, being calcium chloride.

It will be obvious that the application is limited to a very small part of all the flux combinations possible within this salt system and that the diagram is blown up in the horizontal direction by the use of different scales for the ordinaate and the abscissa.

Of the three possible components of the flux, magnesium chloride is the most expensive salt. Therefore, from an economical viewpoint, the preferred salt is one that contains only about 11%, the minimum, of magnesium chloride, say between 11 and 15%; at this concentration the calcium flouride concentration can range between 6 and 15 mole percent, which leaves 83–70 mole percent for the calcium chloride. The very best flux is that located at the lowest stretch of the parabola, which is that containing 11 mole percent of magnesium chloride, between 10 and 12 mole percent of calcium flouride and 79–77 mole percent calcium chloride.

These findings form the basis for the process of this invention. The process of this invention thus comprises mixing thorium dioxide, zinc, magnesium, and a molten flux containing from 11 to 100 mole percent of magnesium chloride, from 0 to 15 mole percent of calcium fluoride and from 89 to 0 mole percent of calcium chloride at a temperature of between 650 and 900° C.; agitating the reaction mixture, whereby the thorium dioxide is reduced to thorium metal and the thorium metal is taken up by the molten magnesium-zinc; and separating the thorium-magnesium-zinc alloy from the flux.

The process is carried out at a temperature of between 650 and 900° C., the exact optimum temperature slightly varying within this range with a change in the composition of the flux; about 750° C. was best for most purposes. The thorium dioxide is advantageously added in comminuted form. The magnesium content of the zinc alloy can range between 1 and 50% by weight, but a content up to 20% was preferred; the best results were obtained with a content of about 5%. An inert atmosphere is used, for example of argon or helium, as has been set forth.

After completed reduction, the metal and flux phases are separated from each other. This can be done by means known to those skilled in the art, for example for decantation or by the combination of solidification and mechanical separation. The zinc and magnesium are removed from the thorium metal by distillation.

It will be understood that the invention is not to be limited to the details given herein but that it may be modified within the scope of the appended claims.

The embodiments of the invention in which an exclusive property or privilege is claimed are defined as follows:

1. A process of reducing thorium dioxide to thorium metal, comprising mixing thorium dioxide with a flux consisting of calcium chloride, calcium fluoride and magnesium chloride at between 650 and 900° C., said flux containing from 11 to 100 mole percent of magnesium chloride, from 0 to 15 mole percent of calcium fluoride and from 89 to 0 mole percent of calcium chloride; adding a magnesium-zinc alloy containing from 1 to 50% by weight of magnesium to the thorium-dioxide-containing flux; agitating the reaction mixture thus obtained while maintaining said temperature of between 650 and 900° C. and an inert dry atmosphere, whereby the thorium dioxide is reduced to thorium metal and taken up by the molten magnesium-zinc alloy; and separating the thorium-magnesium-zinc alloy from the flux.

2. The process of claim 1 wherein the magnesium content of the alloy is about 5% by weight.

3. The process of claim 1 wherein the flux consists of 11 to 15 mole percent magnesium chloride, from 6 to 15 mole percent of calcium fluoride and from 83 to 70 mole percent of calcium chloride.

4. The process of claim 3 wherein the magnesium content of the alloy is about 5% by weight.

5. The process of claim 3 wherein the flux consists of 11 mole percent of magnesium chloride, from 10 to 12 mole percent of calcium flouride and from 79 to 77 mole percent of calcium chloride.

6. The process of claim 5 wherein the magnesium content of the alloy is about 5% by weight.

References Cited by the Examiner
UNITED STATES PATENTS

| | | | |
|---|---|---|---|
| 1,602,542 | 10/1926 | Marden | 75—84.1 |
| 1,659,209 | 2/1928 | Marden | 75—84.1 |
| 2,926,082 | 2/1960 | Whaley | 75—84.1 |
| 2,990,273 | 6/1961 | Chiotti | 75—84.1 |
| 3,164,462 | 1/1965 | Knighton et al. | 75—84.1 |

REUBEN EPSTEIN, *Primary Examiner.*

CARL D. QUARFORTH, *Examiner.*